United States Patent [19]

Motier et al.

[11] 3,862,067

[45] Jan. 21, 1975

[54] FLEXIBLE ELECTROCOATING COMPOSITION DERIVED FROM A LOW MOLECULAR WEIGHT COPOLYMER OF STYRENE AND MALEIC ANHYDRIDE

[75] Inventors: John F. Motier, Secane, Pa.; Donald L. Marion, Wedgewood, N.J.

[73] Assignee: Atlantic Richfield Company, New York, N.Y.

[22] Filed: Apr. 13, 1972

[21] Appl. No.: 243,863

[52] U.S. Cl......... 260/23 S, 264/181, 260/29.6 HN, 260/31.8 K
[51] Int. Cl...................... C08f 19/14, C08f 21/04
[58] Field of Search ... 204/181; 260/23 S, 29.6 HN, 260/21, 31.8 K

[56] References Cited
UNITED STATES PATENTS

| | | | |
|---|---|---|---|
| 2,454,284 | 11/1948 | Kirk | 260/23 S |
| 2,561,313 | 7/1951 | Malinowski | 260/23 S |
| 2,647,094 | 7/1953 | Hahn | 260/23 S |
| 3,085,986 | 4/1963 | Muskat | 260/23 S |
| 3,444,113 | 5/1969 | Ackerman | 260/23 S |
| 3,528,939 | 9/1970 | Pratt | 260/23 S |

*Primary Examiner*—Donald E. Czaja
*Assistant Examiner*—William E. Parker
*Attorney, Agent, or Firm*—Coleman R. Reap

[57] ABSTRACT

A new composition suitable as a coating composition is disclosed. The composition contains partially esterified styrene-maleic anhydride resins and either drying oils or semidrying oils. The esterification agent is generally a long chain $C_{12}$ to $C_{30}$ alkanol. The composition is thermocurable, and it can include pigmentation for color. The composition can be at least partially neutralized and dispersed in water, thereby presenting a composition suitable for electrophoretic applications.

12 Claims, No Drawings

FLEXIBLE ELECTROCOATING COMPOSITION DERIVED FROM A LOW MOLECULAR WEIGHT COPOLYMER OF STYRENE AND MALEIC ANHYDRIDE

The present invention relates to new compositions containing partially esterified styrene-maleic anhydride copolymers combined with drying oils or semidrying oils which can be used as a coating composition or as the base for coating compositions including various pigments and filler type additives. The composition is especially suitable as an electrophoretic coating when the esterified resin is at least partially neutralized and dispersed in water.

The prior art teaches that various vinyl copolymers can be epoxy modified to produce durable solvent-resistant coatings. This literature teaches that when a vinyl copolymer such as a styrene-maleic anhydride copolymer is used, the cross-linking occurs through the carboxyl groups of the copolymer and the epoxide functionality of the epoxy. The literature suggests that polyepoxides in general can be utilized in the coating compositions and some of the more well-known epoxides are the glycidol ethers of polyhydric alcohols, the epoxides of unsaturated esters, poly esters, diolefins, and epoxidized drying oils. While all of these epoxides can be reacted with vinyl copolymers to produce coatings, it is noted that the preparation of the epoxide is a relatively expensive step which causes the resultant coating compositions to be at an economic disadvantage to those coatings which can be made without costly ingredients.

We have unexpectedly found that styrene-maleic anhydride copolymers can be combined with olefinically unsaturated fatty acid triglycerides to produce solvent resistant and corrosion resistant films upon curing. These triglycerides include the drying and semidrying oils generally defined as having an iodine number of greater than about 90. The action between the esterified styrene-maleic anhydride copolymers and the oils is believed to be a crosslinking through the unsaturation in the oils. The resins are unusual in that they do not require olefinic unsaturation to undergo a cross-linking reaction similar to that which occurs with the prior art, as in the case of alkyds.

The composition of the present application which is a partial ester of styrene-maleic anhydride copolymer and a semidrying or drying oil produces a thermosettable coating which is useful in many ways. The composition can be applied directly to an object to be coated by conventional methods such as spraying, painting, or dipping, or it can be easily modified to produce an electrophoretic coating bath. It is particularly suitable for this latter use when the carboxyl groups of the resin are at least partially neutralized with a neutralizing agent which allows the composition to be easily dispersed in a water medium. The prior art generally teaches that a coupling solvent should be utilized in coating compositions for two purposes; namely, to assist in the dispersion of the solids in the water bath, and to improve coating appearance. While a coupling solvent can be utilized in the present coating compositions to advantage, films suitable for many purposes can be obtained without this additive.

The electrophoretic deposition of organic materials to produce uniform coatings on substrates can be used in many parts of the metal finishing industry. Hood in *Metal Finishing*, August 1967, p. 61, describes the advantages of this type of process in finishing a variety of metal parts. The process is particularly useful in applying uniform coatings to all surfaces and interstices of the metal part. This process is more efficient than dip or spray coating because less paint is required to achieve a particular final film thickness. The system can be automated and, furthermore, the electrophoretically applied coating is generally free of solvent which can reduce fire hazards and air pollution. Electrophoretic coatings are generally cured by conventional baking techniques.

The electrophoretic coatings of this invention include compositions containing copolymers of styrene and maleic anhydride which can be dissolved or dispersed in water via amine, ammonia, or alkali metal hydroxide neutralization. The copolymers are first modified by forming partial half-esters with alcohols to provide compatability with olefinically unsaturated fatty acid triglycerides. The esterified copolymers would then be combined with the unsaturated fatty acid triglyceride either before or after the copolymer is at least partially neutralized. The resultant composition is dispersed in water with or without additives such as pigments, coupling solvents, etc., to form an electrophoretic bath. Once electrodeposited on the surface to be coated, this composition can be thermally cured to provide a film which maintains excellent flexibility while being solvent resistant and corrosion resistant.

The acid number of the esterified copolymer is such that a salt formed by partial neutralization provides a waterdispersable or water-soluble system. A coupling solvent can be used under some conditions to form a better dispersion of these resins in water, e.g., the solvent helps put the resin in solution and results in better film surfaces having good impact and corrosion resistance.

In accordance with this invention, a curable coating composition is prepared containing (a) a partial ester of styrene-maleic anhydride copolymer resin esterified to about 12.5 to 67.5 with a saturated or olefinically unsaturated alkanol of 12 to 30 carbon atoms, said styrenemaleic anhydride copolymer having a mole ratio of styrene to maleic anhydride of about 1:1 to 4:1, and a molecular weight of about 500 to 4,000, said partial ester having an acid number in the range of about 20 to 300, and (b) an olefinically unsaturated fatty acid triglyceride, said triglyceride being a semidrying oil or drying oil and having an iodine value of greater than 90; wherein the oil is present in an amount of 33 percent to 300 percent by weight with respect to the esterified styrenemaleic anhydride copolymer.

When the curable coating composition is to be used as an electrophoretic bath, the bath should contain the composition described above, and wherein the partial ester of styrene-maleic anhydride has been at least 20 percent neutralized with a neutralizing agent to form a salt which is water-soluble or waterdispersable. Depending upon the ultimate application of the material to be coated, the bath can also include pigments, antioxidants, anti-foaming agents, bactericides and the like.

The styrene-maleic anhydride copolymers suitable for use in the coating composition have a mole ratio of styrene to maleic anhydride of about 1:1 to 4:1, preferably 2:1 to 4:1, and most preferably, 2.5:1 to 3.5:1. They have a molecular weight of about 500 to 4000 and preferably about 1,000 to 3,000. The most preferred range is 1,650 to 2,500.

The copolymers are partially esterified to about 25 to 125 percent and preferably 70 to 110 percent half-ester with an aliphatic alcohol or mixture of aliphatic alcohols having about 12 to 30 carbon atoms, preferably 14 to 26, and most preferably 15 to 22 carbon atoms. Suitable alcohols include dodecyl, cetyl, stearyl, eicosyl, and tetracosyl. The acid number of the partially neutralized partial esters will be between 20 and 300, preferably 50 to 200; and neutralized to the extent of 20 to 120 percent, preferably 30 to 100 percent based on the acid number of the partial ester copolymer. The neutralizing agent can be selected from the group consisting of ammonia, lower aliphatic amines, lower alkanol amines, and alkali metal hydroxides. Particularly useful amines include those wherein each alkyl group has up to about 5 carbon atoms, preferably up to about three carbon atoms. Preferred agents include dimethanol amine, diethanol amine, diisopropanol amine, dimethyl amine, diethyl amine, and triethyl amine. The water utilized in the electrophoretic bath solution should be deionized water in order to maintain consistency and prevent the various ions that may be present in ordinary water from affecting the coating process.

The olefinically unsaturated fatty acid triglycerides include the drying oils and semidrying oils which can be raw, bodied, or refined. Generally, the drying oils are those oils which have an iodine number of above about 130, and the semidrying oils are those which have an iodine number of about 90 to 130 as determined by the method ASTM-D1467-57T. Examples of such oils include linseed, soya, safflower, perilla, poppy seed, sunflower, tung, walnut, dehydrated castor, corn, herring, and sardine oil. The oil is present in an amount of about 33 to 300 percent and preferably 66 to 200 percent by weight with respect to the esterified styrene-maleic anhydride copolymer. Most preferably, the oil will be present in an amount of 80 to 125 percent by weight. The total weight of the esterified copolymer and the oil in the electrophoretic bath will be about 5 to 30 percent, preferably 6 to 20 percent.

A coupling solvent may be employed in the bath and its concentration can be up to 10 percent; however, it is preferable that it be present in an amount up to 5 percent by weight based on the coating composition bath. Examples of suitable coupling solvents are oxygenated hydrocarbon liquids having up to 12 carbon atoms, lower alkyl ethers of a lower alkylene glycol such as monopropylether of propylene glycol, n-butyl ether of ethylene glycol, and ethylether of diethylene glycol. Other suitable solvents include n-butanol and lower molecular weight hydrocarbons having up to about 12 carbon atoms such as toluene, xylene, and petroleum solvents.

The electrophoretic deposition of the composition of this invention on an electroconductive surface can be achieved by passing a direct electric current of 50 to 300 volts, preferably 100 to 250 volts, through the electrophoretic composition bath to an anode comprising the conductive surface to be coated which is immersed in said bath. This electric current can be applied for a sufficient period of time to give a film of the desired thickness. Generally, the time would be no longer than 10 minutes and preferably 1 to 5 minutes to apply a film of about 0.1 to 2 mils and preferably 0.5 to 1 mil. Subsequently, the coated surface is exposed to a temperature of about 200° to 500°F., preferably, 250° to 450°F. for a time sufficient to cure the coating composition and provide a flexible film which is corrosion and solvent resistant.

EXAMPLE I

Preparation of the Stearyl Alcohol Half-Ester of Styrene-Maleic Anhydride Resin

A styrene-maleic anhydride copolymer, weighing 19,172 g., containing three moles of styrene per mole of maleic anhydride, and having a molecular weight of about 1900, and an acid number of 276, was charged with 13,062 g. stearyl alcohol into a 10 gallon reactor. The charge was heated with stirring to 350°F. for ninety minutes under a nitrogen blanket. The charge was cooled to 325°F., and removed from the reactor. After it solidified, it was ground and analyzed. The product has an acid number of 98 and contained 4.4 percent unreacted alcohol.

EXAMPLE II

Preparation of a Mixed Alcohol Half-Ester of Styrene-Maleic Anhydride Resin

A styrene-maleic anhydride copolymer, weighing 19,172 g. and containing three moles of styrene per mole of maleic anhydride, having a molecular weight of about 1,900 and an acid number of 280, was charged with 13,062 g. of a mixed alcohol containing 16 to 20 carbon atoms into a 10 gallon reactor. The charge was heated with stirring to 350°F. for ninety minutes under a nitrogen blanket. The charge was cooled to 325°F. and removed from the reactor. It was allowed to solidify and then ground and analyzed. The resin had an acid number of 102 and contained 4.2 percent unreacted alcohol.

EXAMPLE III

Preparation of a 50/50 Blend of Alkali Refined Linseed Oil with the Styrene-Maleic Anhydride Copolymer Ester from Example II Equal portions of alkali refined linseed oil and resin from Example II were combined at 250°F. for one hour under nitrogen. The product was a very viscous straw-colored clear liquid.

The advantages of the coatings of this invention are that the styrene-maleic anhydride copolymer and the drying or semidrying oil produces a very flexible film which is resistant to solvents such as xylene. The coating provides better corrosion protection than other common vehicles used for electrophoretic coatings. For comparative purposes, compositions were made utilizing components similar to those described above; however, combined in different manners. For example, a styrenated, maleinized linseed oil coating was prepared using the proportion and procedures taught by Gaseca in U.S. Pat. No. 3,493,483. Likewise, a straight maleinized linseed oil coating was prepared as this was also suggested by Gaseca. These compositions were prepared as stated in examples 4 and 5, and the results of the films obtained with these prior art coatings were compared to those coatings of the present application as can be seen in Table 1. This demonstrates that the copolymer ester-oil provides better corrosion resistance as exemplified by the salt spray test ASTM-B-117-64, and the films are generally more flexible than the prior art films.

EXAMPLE IV

Preparation of a Maleinized Oil

Alkali refined linseed oil, weighing 1200 g., and maleic anhydride, weighing 290 g., were charged to a reactor, blanketed with nitrogen, and heated to 450°F. for 4 1/2 hours. After cooling to ambient temperature, the dark viscous resin had an acid number of 86.

EXAMPLE V

Preparation of a Styrenated Maleinized Oil

Alkali refined linseed oil, weighing 2432 g. and maleic anhydride, weighing 769 g., were charged to a reactor, blanketed with nitrogen, and heated to 450°F. for 3 ½ hours. The reaction product was cooled to 320°F. and 16.4 g. of di-t-butyl peroxide dissolved in 612 g. polymer grade styrene was added gradually over a 20 minute period. The reaction temperature was raised to 390°F. and held there for two hours. After cooling to ambient temperature, the dark liquid resin had an acid number of 109.

EXAMPLE VI

Preparation of an Electrodeposition Bath

Four hundred g. of the vehicle from Example III was diluted with 100 g. of ethylene glycol monobutylether. To this solution was added with stirring 14.4 g. of triethylamine, 3485.6 g. of deionized water was then added slowly to the neutralized vehicle solution under vigorous agitation. The 10 percent solids bath was aged for 24 to 48 hours prior to use. The pH of the dispersion was 8.80.

EXAMPLE VII

Preparation of a Test Specimen

A coated steel panel for testing was prepared in the following manner: The electrocoating bath from Example VI was filtered through a 25μ filter and placed in a stainless steel container which was connected to a D.C. power source as the cathode. A zinc phosphated cold rolled steel panel (Bonderite 37) was placed in the bath and connected as the anode. The voltage was adjusted to 200 volts and maintained there for two minutes. The panel was removed from the bath, rinsed with deionized water and baked at 350°F. for 25 minutes. The film thickness was 0.7 to 1.0 mil. The coated panels passed forward and reverse impacts of 100 in.-lbs. and bending over a ¼ inch mandrel. Coated panels were scribed with an "X" and subjected to 5 percent sodium chloride fog at 95°F. and 100 percent relative humidity (ASTM-B-117-64). Failure in this test was adjudged to occur when either rust creepage at the scribe was greater than one-eighth inch or blisters reached the "few" designation (ASTM-D714-56).

Additional electrocoating baths were prepared as in Example VI using the variety of vehicles set forth in Table I. Test panels were coated from these baths following the procedure in Example VII. The results of the salt fog exposure and physical testing of these specimens is included in Table I.

TABLE 1

CORROSION RESISTANCE AND PHYSICAL TESTING OF VARIOUS ELECTROCOATING VEHICLES

| Vehicle[2] (Wt. %) | | Salt Spray Resistance: Hours to Fail (ASTM B117-64) | | Neutralization, % | Film Thickness[1] (Application Voltage) Bond. 37 | Physical Testing on Bond. 36 Panels | | |
|---|---|---|---|---|---|---|---|---|
| | | Bond 37 | A European Steel | | | Direct Impact[3] | Reverse Impact[3] | Mandrel Bend |
| SMA (50) | ARLO (50) | 360 | 114 | 40 | 0.95(200) | >160 | >160 | Pass ¼" |
| SMA (75) | ARLO (25) | 96 | — | 40 | 0.52(200) | 80 | 20 | Fail 1" |
| SMA (25) | ARLO (75) | 240 | — | 80 | 0.47(200) | >160 | 70 | Pass ¼" |
| SMA (75) | MLO (25) | 114 | — | 60 | 0.20(200) | >160 | >160 | Pass ¼" |
| SMA (50) | MLO (50) | 240 | 48 | 40 | 0.52(300) | >160 | >160 | Pass ¼" |
| SMA (25) | MLO (75) | 190 | 48 | 80 | 0.83(250) | 120 | 100 | Pass ½" Fail ⅜" |
| | MLO (100) | 190 | 48 | 90 | 0.75(75) | >160 | 100 | Pass ¼" |
| | SMLO (100) | 190 | 48 | 80 | 0.78(220) | 140 | 80 | Pass ⅜" Fail ¼" |

[1] Baked 350°F. for 25 minutes; thicknesses in mils.
[2] SMA = styrene-maleic anhydride (311) copolymer ester from Example II, ARLO = alkali refined linseed oil, MLO = maleinized linseed oil, SMLO = styrenated maleinized linseed oil.
[3] Maximum inch-pounds without failure.

We claim:

1. An aqueous electrophoretic coating composition bath containing as the sole curable components:
   a. an at least partially neutralized, partial ester of styrene-maleic anhydride copolymer resin esterified to about 12.5 to 67.5 percent with a saturated or olefinically unsaturated alkanol of about 12 to 30 carbon atoms, said styrene-maleic anhydride copolymer having a mole ratio of styrene to maleic anhydride of about 1:1 to 4:1, and a molecular weight of about 500 to 4,000, said partial ester copolymer having an acid number in the range of about 20 to 300 and being neutralized to the extent of about 20 to 120 percent based on the acid number of the partial ester copolymer, with a neutralizing agent selected from the group consisting of ammonia, lower alkyl amines having up to 5 carbon atoms per alkyl group, alkanol amines having up to 5 carbon atoms per alkyl group and alkali metals, and
   b. an olefinically unsaturated fatty acid triglyceride, said triglyceride being a semidrying oil or drying oil and having an iodine value of greater than 90; wherein the oil is percent is present in an amount of 33 percent to 300 percent by weight with respect to the esterified styrene-maleic anhydride copolymer,
   said partial ester and said triglyceride being present in an amount of 5 to 30 percent by weight of the total bath.

2. The electrophoretic coating composition bath of claim 1 wherein said esterification alcohol is stearyl alcohol.

3. The electrophoretic coating composition bath of claim 1 wherein said esterification alcohol is cetyl alcohol.

4. The electrophoretic coating composition bath of claim 1 wherein said esterification alcohol is eicosyl alcohol.

5. The electrophoretic coating composition bath of claim 1 wherein the esterification agents is a mixture of $C_{16}$ to $C_{20}$ alcohols.

6. The electrophoretic coating composition bath of claim 1 wherein said styrene-maleic anhydride copolymer has about 2:1 to 4:1 mole ratio of styrene to maleic anhydride.

7. The electrophoretic coating composition bath of claim 1 wherein said neutralization agent is selected from the group consisting of dimethanol amine, dimethyl amine, dimethyl ethanol amine, diethyl amine, triethyl amine, diisopropanol amine, and ammonia.

8. The electrophoretic coating composition bath of claim 1 wherein said neutralization agent is ammonia.

9. The electrophoretic coating composition bath of claim 1 wherein the olefinically unsaturated fatty acid triglyceride is selected from the group consisting of raw, bodied, or refined linseed, maleinized linseed, safflower, sunflower, dehydrated castor, or corn oil.

10. The electrophoretic coating composition bath of claim 1 wherein the olefinically unsaturated fatty acid triglyceride is linseed oil.

11. The electrophoretic coating composition bath of claim 1 having therein a coupling solvent selected from the group consisting of monopropyl ether of propylene glycol, n-butyl ether of ethylene glycol, ethyl ether of dietnylene glycol, n-butanol, toluene and xylene.

12. A process for electrophoretic deposition of a styrene-maleic anhydride resin on an object having an electrically conductive surface which comprises passing a direct electric current through the electrophoretic coating composition bath of claim 1, to said object in said bath, said object acting as the anode.

* * * * *